United States Patent [19]
Conrad

[11] Patent Number: 4,778,496
[45] Date of Patent: Oct. 18, 1988

[54] HIGH EFFICIENCY PARTICULATE AIR FILTER CABINET

[75] Inventor: John Conrad, Westlake, Calif.

[73] Assignee: William R. Eckstrom, Dolton, Ill.

[21] Appl. No.: 120,401

[22] Filed: Nov. 13, 1987

[51] Int. Cl.[4] .................................................. B01D 46/10
[52] U.S. Cl. ........................................ 55/472; 55/356; 55/473
[58] Field of Search ................... 55/356, 467, 471–473

[56] References Cited

U.S. PATENT DOCUMENTS

| | | | |
|---|---|---|---|
| Re. 27,701 | 7/1973 | Allan, Jr. et al. | 55/500 |
| 1,937,483 | 11/1933 | Shurtleff | 55/467 X |
| 2,114,761 | 4/1938 | Crider | 55/471 |
| 2,484,491 | 10/1949 | Daugherty | 55/471 X |
| 3,012,762 | 12/1961 | Norris | 55/269 |
| 3,375,640 | 4/1968 | Pelosi, Jr. | 55/473 X |
| 3,577,710 | 5/1971 | Feldman | 55/473 X |
| 3,606,998 | 9/1971 | LaPorte et al. | 55/473 X |
| 3,654,747 | 4/1972 | Remick | 55/467 X |
| 3,745,750 | 7/1973 | Arff | 55/467 X |
| 3,802,168 | 4/1974 | Dekas | 55/473 |
| 3,828,530 | 8/1974 | Peters | 55/473 |
| 3,935,803 | 2/1976 | Bush | 55/473 X |
| 3,960,527 | 6/1976 | Goettl | 55/269 |
| 4,023,472 | 5/1977 | Grunder et al. | 55/467 X |
| 4,268,285 | 5/1981 | Mason | 55/473 X |
| 4,531,956 | 7/1985 | Howorth | 55/473 X |
| 4,548,627 | 10/1985 | Landy | 55/473 X |
| 4,560,395 | 12/1985 | Davis | 55/473 X |
| 4,685,944 | 8/1987 | Allan et al. | 55/491 |

FOREIGN PATENT DOCUMENTS 2311485  1/1977  France ................... 55/473

*Primary Examiner*—Robert Spitzer
*Attorney, Agent, or Firm*—Harpman & Harpman

[57] ABSTRACT

A multi-part cabinet enclosing a high efficiency particulate air filter and a blower for moving air therethrough positions the filter in a first part of the cabinet and sealingly connects it with a second part of the cabinet in which the blower and its motor are located. A third part of the cabinet encloses the first part and provides a screened access opening so that air to be filtered can enter the third part of the multi-part cabinet and flow therefrom through the high efficiency particulate air filter in the first part of the cabinet and from the filter into the second part of the cabinet and the blower therein, the second part of the cabinet being provided with a screened air exit, the first part of the multi-part cabinet being permanently sealingly attached to the second part of the multi-part cabinet. The interconnection of the first, second and third parts of the multi-part cabinet positively prevent air leaks which adversely affect the efficiency of the high efficiency particulate air filter.

8 Claims, 2 Drawing Sheets

HIGH EFFICIENCY PARTICULATE AIR FILTER CABINET

BACKGROUND OF THE INVENTION

1. Technical Field

This invention relates to high efficiency particulate air filters and cabinets containing the same and blowers for moving air therethrough.

2. Description of the Prior Art

Prior devices of this type may be seen in U.S. Pat. No. 3,012,762 in which modular units are assembled for air heating, cooling and ventilating systems, U.S. Pat. No. Re. 27,701 wherein a filter frame seal is disclosed, U.S. Pat. No. 3,802,168 wherein a room air cleaner incorporating a filter and a blower is disclosed, U.S. Pat. No. 3,960,527 which illustrates and describes air delivery and treatment apparatus, and U.S. Pat. No. 4,685,944 wherein a high efficiency particulate air filter is described which is mounted in a peripheral frame.

This invention discloses a high efficiency particulate air filter and air moving blower in a novel multiple part cabinet mounted on wheels for portability and of the size and type commonly referred to as a negative air pressure machine such as used in capturing flying asbestos fibers and other air contaminating particulate material and wherein the detrimental air leakage of such devices heretofore common in the art has been eliminated by the multi-part cabinet structure.

SUMMARY OF THE INVENTION

A multi-part cabinet operatively encloses a high efficiency particulate air cleaner and a blower and energizing source therefor in a cabinet in which air can only enter through a desired inlet opening and leave through a specified inlet opening due to the inter-engagement in sealing relation of the multiple parts of the cabinet, a first of which positions the high efficiency particulate air filter in communication with the second part which encloses a blower and a source of energization therefor, the first part of the multiple part air cleaner being positioned entirely within a third part of the multiple part cabinet, the three parts being assembled to one another in sealing relation so that no air leakage can occur.

DESCRIPTION OF THE PREFERRED EMBODIMENT

Figure 1:
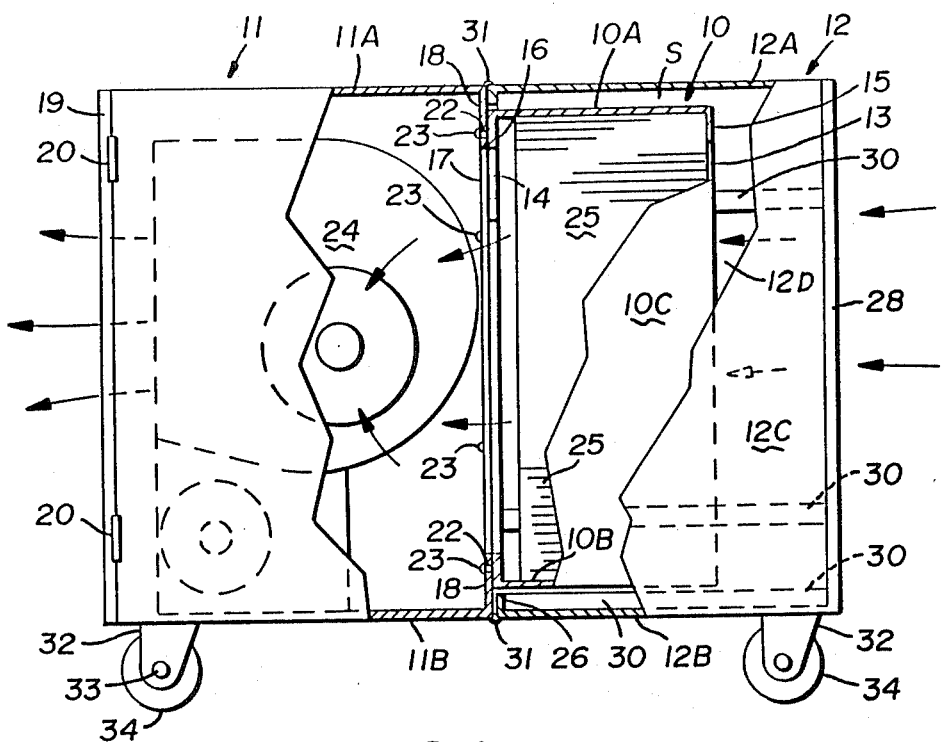
FIG. 1 is a side elevation of the high efficiency particulate air filter cabinet with parts broken away and parts in cross section.

In the form of the invention chosen for illustration herein three hollow cabinets 10, 11 and 12 are assembled to one another as hereinafter described to form airtight seals between the respective cabinets. The cabinet 10 is adapted to receive and position a high efficiency particulate air filter therein such as for example the filter illustrated in hereinbefore referred to prior art U.S. Pat. No. 4,685,944. As known in the art, such a filter comprises a sheet of HEPA filtering media folded upon itself in accordian fashion to form a filter pack and the pack is usually provided with a thin peripheral frame surrounding and supporting the pack. The cabinet 10 has openings 13 and 14 in its front and back sides respectively, the openings 13 and 14 being defined by inturned flanges 15 and 16 respectively.

The cabinet 11 is open at its front and back sides respectively, the opening at its front side being indicated by the numeral 17 and defined by an inturned flange 18. The opening in the opposite or back side of the cabinet 11 is defined by a similar inturned flange and a screened outlet door 19 is attached thereto by hinges 20.

Figure 3:
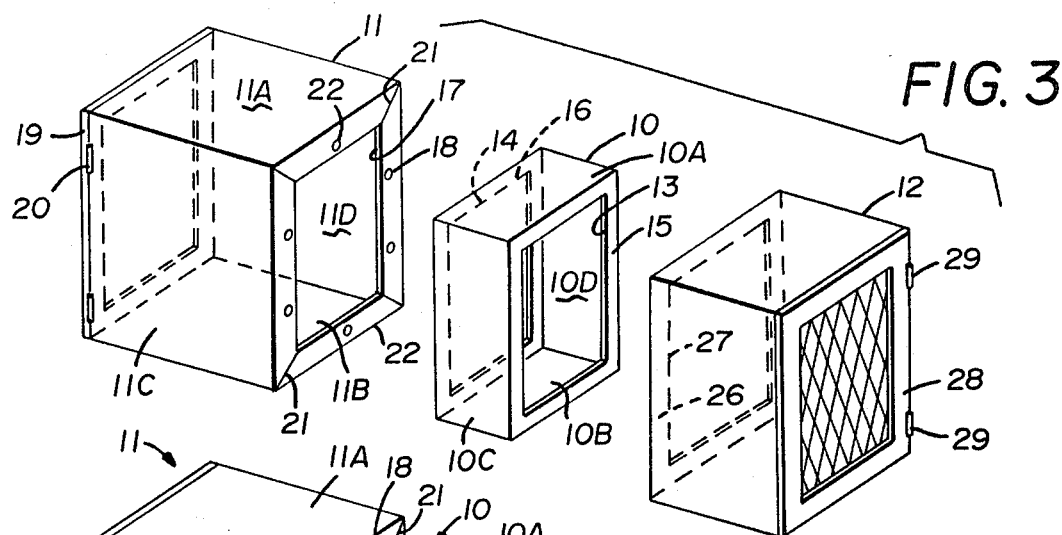
FIG. 3 is an exploded perspective elevation of the multi-part cabinet.

By referring to FIG. 3 of the drawings and the second cabinet 11, it will be seen that the inturned flange 18 which defines the opening 17 is preferably formed by shaping the top, bottom, and side panels 11A, 11B, 11C, and 11 D so that when the panels are in the form illustrated in FIG. 3 of the drawings, the flange 18 extends inwardly therefrom at a right angle thereto and that the four corners 21 of the inturned flange 18 are joined to one another in airtight relation as by welding so that a smooth outermost continuous surface of the flange 18 results. A plurality of openings 22 are formed in the inturned continuous flange 18 in longitudinally spaced relation to one another and in relatively closely spaced relation to the opening 17 defined by the continuous flange 18.

Figure 4:
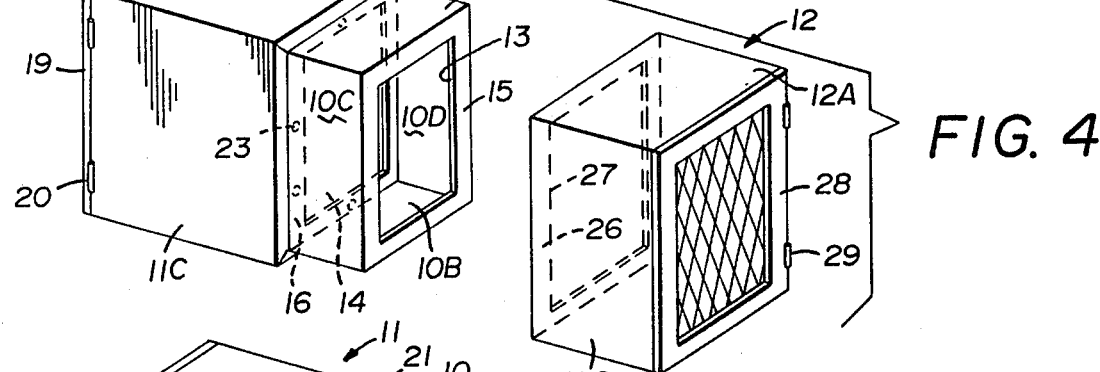
FIG. 4 is an exploded perspective view showing two parts of the multi-part cabinet assembled.

By referring now to FIGS. 1 and 4 of the drawings, it will seen that the first cabinet 10 has been moved into registering position with the second cabinet 11 so that the inturned flange 16 thereof which is continuous around the opening 14 which it defines registers against the inturned flange 18 of the second cabinet 11 with the openings 22 registering therewith. Plug welds 23 are formed in each of the openings 22 as by an electric arc welder and a welding rod engaged in the openings 22 so as to heat the metal of the continuous inturned flange 18 and the metal of the continuous inturned flange 16 and deposit sufficient welding metal in the openings 22 to weld the continuous inturned flange 18 of the second cabinet 11 to the inturned flange 16 of the first cabinet 10. The cooling of the metal of the flanges effectively joins the flanges to one another in an airtight manner. It will be observed that the openings 22 in the continuous inturned flange 18 may be of any desired shape including but not limited to circular openings, square openings, and elongated openings.

Still referring to FIGS. 1 and 4 of the drawings, it will be observed that in the preferred form of the invention the first cabinet 10 is of smaller overall size than the third cabinet 12 leaving an air space S as designated in FIG. 1 of the drawings between the top, bottom, and sides of the first cabinet 10 and the inner surfaces of the top, bottom, and sides of the third cabinet 12. The joined cabinets 10 and 11 receive an air moving device such as a blower 24 which is positioned in the cabinet 12 along with a means for energizing the same, such as an electric motor and a suitable driving connection, the blower being positioned so as to exhaust air propelled thereby outwardly through the screened outlet door 19 which forms the back of the second cabinet 11.

A high efficiency particulate air filter unit 25 is positioned in the first cabinet 10 as illustrated in FIG. 1 of the drawings and is secured to the top, bottom, and side wall panels 10A,B,C and D respectively, so that all of the air being moved through the first cabinet 10 by the blower 24 must flow through the filter unit 25, all as shown in FIG. 1.

Figure 2:
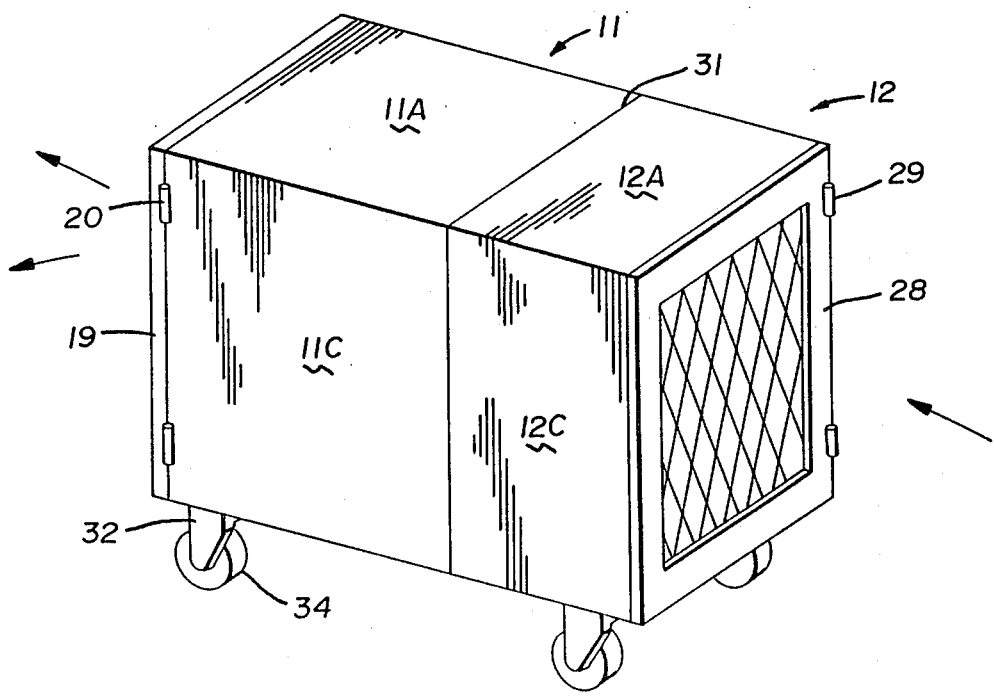
FIG. 2 is a perspective elevation thereof.
Figure 5:
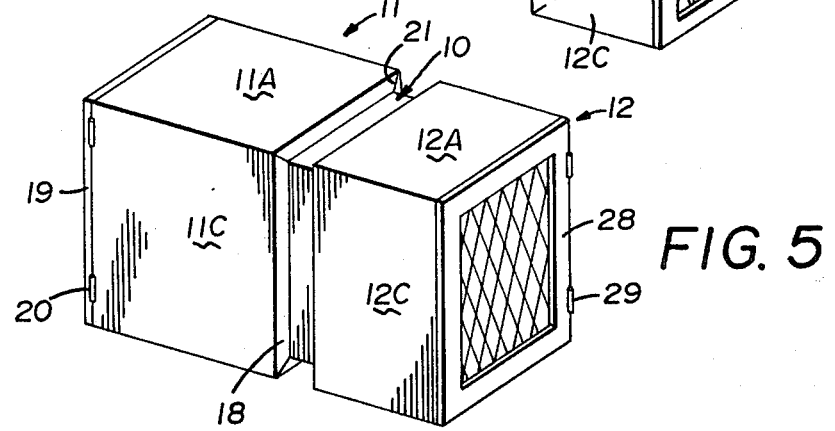
FIG. 5 is a perspective view showing the parts of the multi-part cabinet partially assembled.

By referring now to FIGS. 1 and 2 of the drawings, it will be seen that the third cabinet 12 formed of top, bottom, and side panels 12A,B,C and D respectively as shown in FIG. 5 being moved over the first cabinet 10 toward the second cabinet 11 and shown in its final assembled position in FIGS. 1 and 2 wherein an inturned flange 26 on its inner end defines an opening 27 through which the first cabinet 10 is received when the third cabinet 12 is moved thereover and into engagement with the second cabinet 11. The inturned flange 26 spaces the top, bottom and side panels 12A,B,C and D of the third cabinet 12 with respect to the top, bottom and side panels 10A,B,C and D of the first cabinet 10 to create the space S so that any air leaking into the device at the point of engagement and attachment of the third cabinet 12 to the second cabinet 11 must flow toward the opening 13 in the first cabinet 10 and then into the filter unit 25 therein and into the blower 24 thus insuring that all of the air moved by the blower 24 will move through the high efficiency particulate air filter unit 25. The front or outer end of the third filter cabinet 12 is open and defined by an inturned flange duplicating the inturned flange 26 on its opposite end and is provided with a screened air inlet door 28 movably attached to the third cabinet 12 by hinges 29.

By referring now to FIG. 1 of the drawings, it will be seen that a plurality of horizontally extending ribs or runners 30 are positioned on the inner surface of the bottom 12B of the third cabinet 12 in horizontally spaced relation and on both of the side panels 12C and 12D respectively in vertically spaced relation, the ribs or runners 30 extending into the area within the third cabinet 12 a distance approximately equal to the width of the inturned flange 26 on the inner end and its duplicate inturned flange on the front or outer end of the cabinet 12 so as to insure the proper spacing of the first cabinet 10 in which the filter unit 25 is positioned with respect to the inner surfaces of the top, bottom and side panels 12A,B,C and D, respectively of the third cabinet 12. The ribs or runners 30 on the bottom 12B of the third cabinet 12 also serve to support the first cabinet 10 and the filter unit 25 therein and assist in insuring that no distortion will occur in the inturned flanges 18 and 16 of the second and first cabinets where they are joined to one another in airtight relation by the plug welds 23 hereinbefore described.

The abutting surfaces of the inturned smooth-faced flanges 18 and 26 on the second and third cabinets 11 and 12 respectively are preferably secured to one another by tack or bead welds 31 which complete the assembly of three cabinets to one another. As illustrated in FIGS. 1 and 2 of the drawings, the completed device is provided with four brackets 32 each of which carries an axle 33 and a wheel 34 so that the device is readily movable.

Those skilled in the art will observe that if desired intake and/or outlet funnel-like manifolds may be removably attached to the device and/or the hinged screened doors 19 and 28 at its air intake and outlet ends as such funnel intake or outlet manifolds are available commercially together with suitable, non-collapsible, flexible air duct by which the intake and/or outlet air may be remotely received or directed.

Additionally, snap-on attachments may be similarly used with the device for the temporarily effective positioning of expendible prefilters which may incorporate carbon and/or other materials capable of absorbing and/or retaining various fumes and gases. Such prefilters may also be located in the cabinet 12.

It will occur to those skilled in the art that suitable controls for the blower 26 and its energizing means which are located in the second cabinet 11 may be conveniently and practically installed on the exterior of the second cabinet 11.

The above-described structure provides an efficient negative air machine incorporating a high efficiency particulate air filter unit so formed as to avoid inlet air leaks between the filter unit and the air moving blower as frequently occurs in the prior art devices.

Although but one embodiment of the present invention has been illustrated and described, it will be apparent to those skilled in the art that various changes and modifications may be made therein without departing from the spirit of the invention and having thus described my invention, what I claim is:

1. A structure for sealably connecting a filter in a first cabinet to an air moving means in a second cabinet, said first and second cabinets having inturned flanges defining oppositely disposed inlet and outlet openings, said inturned flanges defining said outlet opening in said first cabinet and said inturned flanges defining said inlet opening in said second cabinet having registering surfaces positioned on a common plane, means fastening said flanges to one another with said surfaces of said flanges in sealing relation, said first cabinet being of a known height and width and has impervious top, bottom and oppositely disposed side walls extending between said oppositely disposed inlet and outlet openings and wherein a third cabinet of a size greater than said first cabinet has oppositely disposed inlet and outlet openings and top, bottom and oppositely disposed side walls extending therebetween, said top, bottom and oppositely disposed side walls being spaced with respect to said top, bottom and oppositely disposed side walls of said first cabinet so as to form an air space therearound, said inlet opening in said third cabinet being in spaced relation to said inlet opening in said first cabinet whereby air entering said third cabinet is directed to said inlet opening of said first cabinet so as to move exclusively through said filter unit therein toward said air moving means.

2. The structure of claim 1 wherein said inturned flanges defining the outlet opening in said first cabinet and the inturned flanges defining the inlet opening in said second cabinet are of different widths so that said inlet and outlet openings defined thereby are of equal size.

3. The structure set forth in claim 1 wherein said inturned flanges defining the outlet opening in said first cabinet and the inlet opening in the second cabinet are of different widths so that said inlet and outlet openings defined thereby are of equal size and wherein said third cabinet is of a size the same as said second cabinet is positioned over and around said first cabinet, said third cabinet having inturned flanges defining an outlet opening, said inturned flanges of said third cabinet engaging said inturned flanges defining said inlet opening in said second cabinet, said second and third cabinets secured to one another adjacent said engaging inturned flanges of said second and third cabinets.

4. The structure of claim 1 wherein said third cabinet is of the same size as said second cabinet and has impervious top, bottom and oppositely disposed side walls said inlet opening in said third cabinet spaced with respect to said inlet opening in said first cabinet so as to form a second air space communicating with said first mentioned air space, inturned flanges on said third cabinet defining said outlet opening therein, said inturned flanges on said third cabinet defining said outlet opening therein having surfaces registering with said inturned flanges defining said inlet opening in said second cabinet, means adjacent said last mentioned inturned flanges securing said third cabinet to said second cabinet.

5. An improvement in a negative air pressure device having a blower for moving air through a high efficiency particulate air filter so as to filter and exhaust air from a work area, the improved apparatus comprising an assembled multi-part cabinet, a high efficiency particulate air filter in a first one of said multi-part cabinets, a blower and means for energizing it in a second one of said multi-part cabinets and a third one of said multi-part cabinets forming a housing around said first one of said multi-part cabinets having said filter therein, said third one of said multi-part cabinets being positioned over and around said first one of said multi-part cabinets having said filter therein so as to form an air space between said first one of said cabinets and said third one of said cabinets, an air inlet in said third one of said multi-part cabinets, an air outlet in said second one of said multi-part cabinets and communicating openings in said first one of said cabinets and said second one of said cabinets, said first one, second one, and third one of said cabinets secured to one another on a common plane, said communicating openings in said first and second cabinets lying on said common plane.

6. The improvement in the negative air pressure device of claim 5 and wherein means in said first one and said second one of said cabinets defines said communicating openings and is sealingly engaged therearound.

7. The improvement in the negative air pressure device of claim 5 and wherein means in said first one and said second one of said cabinets defines said communicating openings and is sealingly engaged therearound and scondary means on said third cabinet sealingly engaging said first cabinet around said communicating opening and said first cabinet.

8. The improvement in the negative air pressure device of claim 5 and wherein said filter is engaged in said first cabinet so that all air moving through said air inlet in said third cabinet and through said air space therein moves through said filter.

* * * * *